Jan. 23, 1962     WALTER KIWI     3,017,985
CONVEYORS FOR MACHINES

Filed Jan. 27, 1960     2 Sheets-Sheet 1

*INVENTOR.*
WALTER KIWI
BY
B. T. Wobensmith
ATTORNEY

Jan. 23, 1962 WALTER KIWI 3,017,985
CONVEYORS FOR MACHINES
Filed Jan. 27, 1960 2 Sheets-Sheet 2

INVENTOR.
WALTER KIWI
BY
ATTORNEY

United States Patent Office 3,017,985
Patented Jan. 23, 1962

3,017,985
CONVEYORS FOR MACHINES
Walter Kiwi, Torresdale Manor, Pa., assignor to R. H. Hood Company, Philadelphia, Pa., a corporation of Pennsylvania
Filed Jan. 27, 1960, Ser. No. 5,068
3 Claims. (Cl. 198—170)

This invention relates to conveyors, and more particularly to a conveyor for moving articles along a predetermined path which can be a horizontal machine table, platform, or the like, with a predetermined linear movement.

In machines in which various operations are performed on or in connection with articles, it is frequently necessary that articles be moved to a predetermined extent on a horizontal surface for the performance of the desired operations, and the conveyor hereinafter described is particularly useful for this purpose.

In accordance with the present invention a conveyor is provided having one or more simultaneously movable conveyor pegs in which the pegs are mounted and impelled in an improved manner.

In accordance with the present invention also, a conveyor is provided having a plurality of conveyor pegs arranged for compact disposition within a mounting frame and for movement out of the frame for disposition in operating positions and movable into the frame for disposition in non-impelling positions during return to operating position.

In accordance with the present invention also, a conveyor is provided having a plurality of conveyor pegs which are guided and controlled during their article impelling movement and during their non-impelling advancing movement.

In accordance with the present invention also, a conveyor is provided having conveyor pegs movable in vertical runs during non-impelling operation with simple but effective controlled movement of the conveyor pegs into and out of impelling positions.

In accordance with the present invention, also, a conveyor is provided having a plurality of conveyor pegs which in the non-impelling positions are effectively handled with a minimum of excess space.

In accordance with the present invention, also, a conveyor is provided employing a plurality of chains with simple but effective adjustments to accommodate changes or variation in chain length without interfering with the timing of the pegs.

Other objects and advantageous features of the present invention will be apparent from the description and claims.

The nature and characteristic features of the invention will be more readily understood from the following description, taken in connection with the accompanying drawings forming part thereof, in which.

Figure 1:
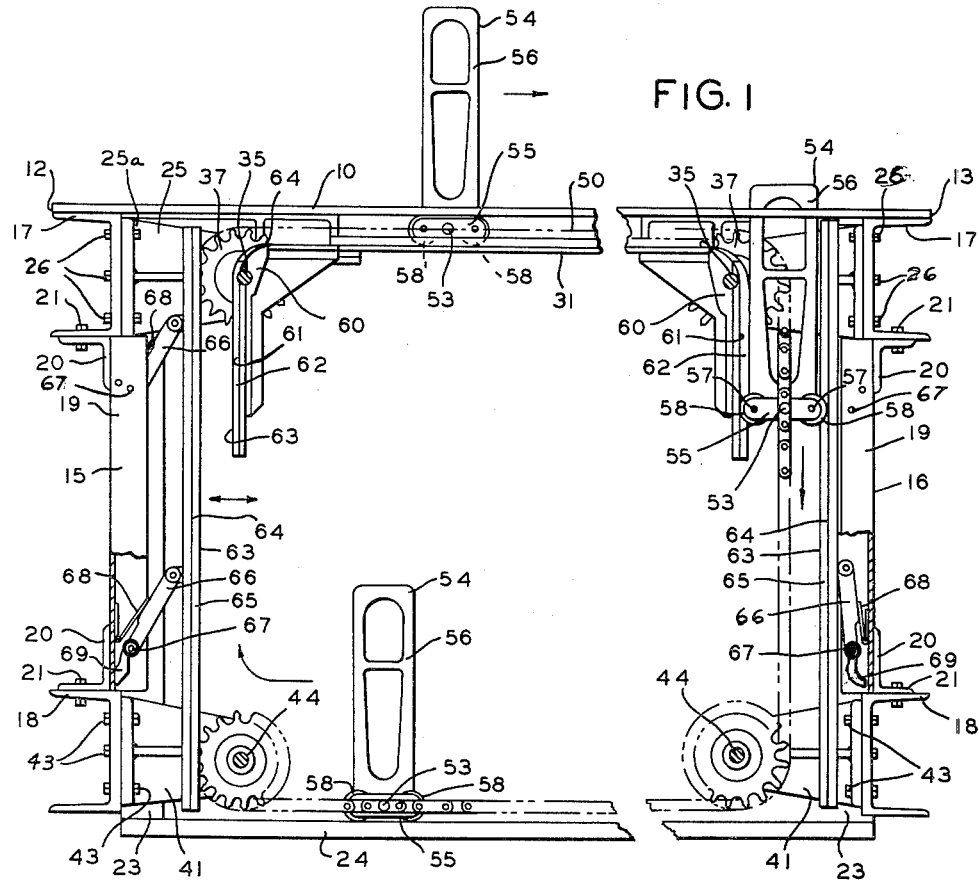
FIGURE 1 is a fragmentary side elevational view of a conveyor in accordance with the invention, parts being broken away to show the details of the construction.
Figure 2:
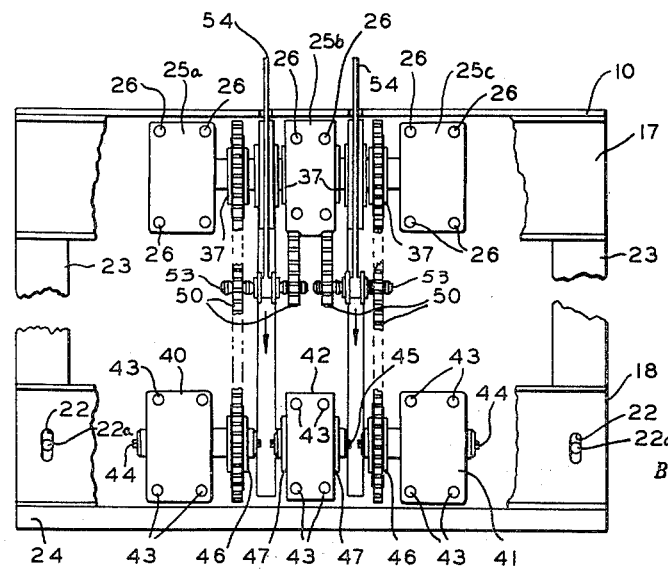
FIG. 2 is an end elevational view as seen from the right of FIG. 1, parts being broken away to show the details of construction.
Figure 3:
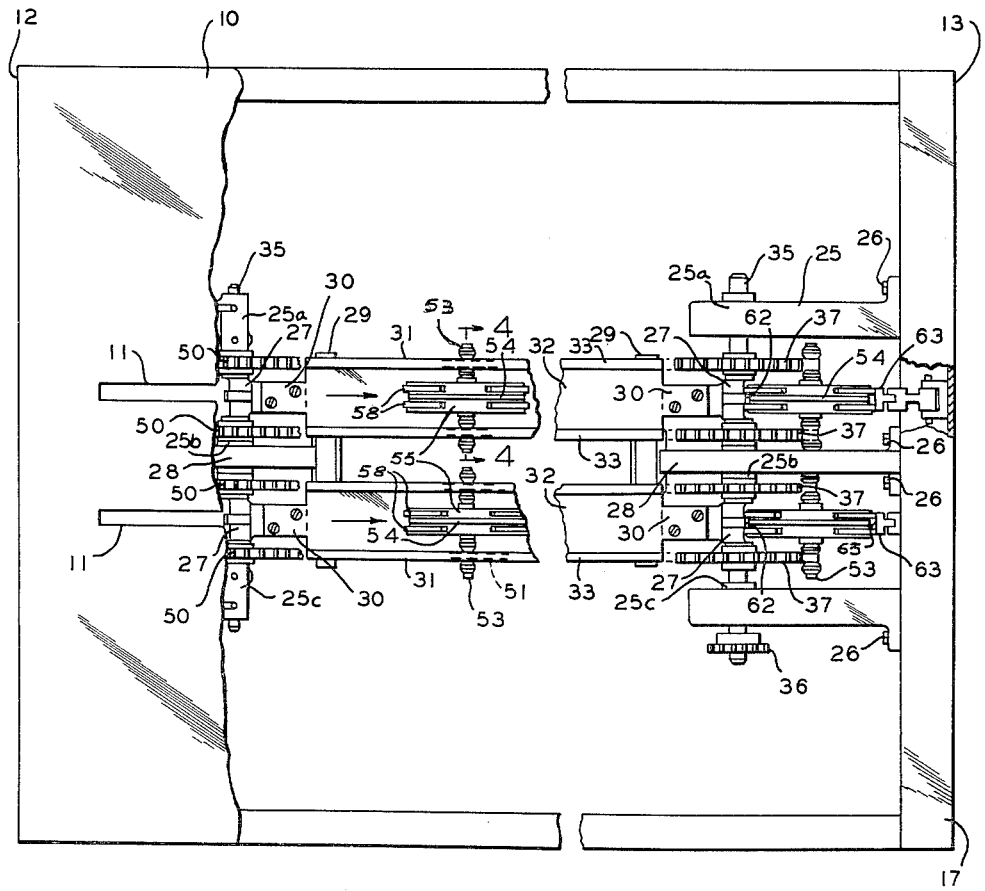
FIG. 3 is a top plan view of the conveyor shown in FIG. 1, the conveyor table top being broken away to show the details of construction.

It should, of course, be understood that the description and drawings herein are illustrative merely and that various modifications and changes can be made in the structure disclosed without departing from the spirit of the invention.

Like numerals refer to like parts throughout the several views.

Referring now more particularly to the drawings, the table top or platform of a machine is shown at 10, having a plurality of spaced parallel slots 11 extending therealong and terminating inwardly from the supplying and delivering end margins 12 and 13 of the table top or platform 10.

The table top or platform 10 is preferably supported in any desired manner, dependent upon the size, shape and weight of the articles to be carried along the table top or platform 10, and preferably includes spaced end frame members 15 and 16.

The end frame members 15 and 16 each include upper and lower horizontal channels 17 and 18 and vertical channels 19. Upper and lower angle brackets 20 secured by bolts 21 to the upper channels 17 and lower channels 18 can also be provided. The lower channels 18 are provided with vertically elongated slots 22 for the reception of bolts 22a which extend through end posts 23 to adjust the horizontal position of the channels 18 for chain accommodation, as hereinafter pointed out.

The end frame members 15 and 16 can be connected at the bottom by a base plate 24.

The upper horizontal channels 17 at the supplying end and at the delivering end have upper brackets 25 with spaced bearing supporting sections 25a, 25b and 25c. The brackets 25 are held in position on the upper channels 17 by bolts 26. The sections of the brackets 25 are connected by intermediate connectors 27 and with a supporting extension 28 extending horizontally inwardly with a transverse bracket bar 29 carried thereon. The connectors 27 have secured thereto end extensions 30 of horizontal trackways 31 which are also supported on the bracket bars 29.

Figure 4:
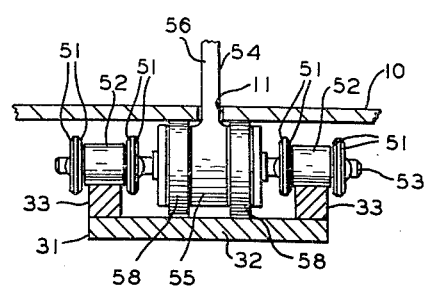
FIG. 4 is a fragmentary vertical sectional view, enlarged, taken approximately on the line 4—4 of FIG. 3.

Each of the trackways 31 includes a central section 32 with side rail flanges 33 as shown in detail in FIG. 4.

Each of the upper brackets 25 has a shaft 35 journalled therein. The shaft 35 at the delivery end has a driving sprocket 36 secured thereto. Each of the shafts 35 is provided with sprockets 37 secured thereto for rotation therewith.

The lower horizontal channels 18 at the supplying end and at the delivering end have spaced lower outer journal supporting brackets 40 and 41 secured thereto with intermediate journal supporting brackets 42 therebetween, the brackets 40, 41 and 42 being secured in position by bolts 43. Each of the brackets 40 and 41 is provided with a cantilever shaft 44 and the intermediate journal supporting brackets 42 are each provided with shafts 45. The shafts 44 have sprockets 46 carried thereby, and the shafts 45 each has a pair of sprockets 47 carried thereby for rotation together.

Conveyor chains 50 are provided, carried respectively on the sprockets 37 and 46, 37 and 47, 37 and 47, and 37 and 46.

The conveyor chains 50 are preferably of the endless type with a pair of spaced rows of pivotally interconnected links 51, and with rollers 52 between the links at each of the pivots. Each pair of sprocket chains 50 has carried thereby at predetermined spaced locations, conveyor peg mounting shafts 53 on which conveyor pegs 54 are mounted.

The conveyor pegs 54 each include a base portion 55 through which the shaft 53 extends and an impelling arm 56. The base portion 55 in spaced parallel relation to the shaft 53 has a pair of supporting roller shafts 57 carried thereby, the roller shafts having spaced rollers 58 thereon for engagement with the upper face of the plate 24 at their lower positions, and for engagement in their upper positions with the upper faces of the trackway central sections 32 between the rail flanges 33. The rollers 58 can be of any preferred material but nylon has been found suitable to reduce wear and provide a longer life. The base portions 55 at each end thereof and between the rollers are recessed to facilitate the guiding and positioning of the conveyor pegs 54.

The trackways 31 at the ends thereof have secured thereto peg control cams 60 for aiding in maintaining vertical positioning of the conveyor pegs 54. The cams 60 each include a guide face 61 for engagement by pairs of rollers 58 with an interposed central guide flange 62 for preventing sidewise displacement of the pegs 54. The cams 60 each include a vertical portion 63 and an arcuate portion 64 at the top to engage the rollers 58 as the conveyor pegs 54 approach and leave the trackways 31.

The cams 60 can have renewable wear faces on which the guide faces 61 and guide flanges 62 are formed, phenolic resin having been found suitable for this purpose.

At each of the end frame members 15 and 16 resiliently impelled vertical rail sections 63 are provided for aiding in maintaining vertical positoning of the conveyor pegs 54. The rail sections 63 each have a vertical face 64 for engagement by pairs of rollers 58 with an interposed central guide flange 65 for preventing sidewise displacement of the pegs 54. The rail sections 63 are pivotally connected by links 66 carried on pivot pins 67 to the vertical channels 19, springs 68 being provided for normally urging the links 66 and the rail sections 63 carried thereby toward the sprockets 37 and the sprockets 46 and 47. The links 66 can have ends 69 which limit the swinging movement thereof by engagement with the inner faces of the channels 16.

The mode of operation will now be pointed out.

Rotation of the sprocket 36 through a predetermined angular movement is effective for rotating the shaft 35 on which the sprocket 36 is carried and this in turn effects rotation of the upper sprockets 37 at the delivering end of the table top 10. Rotation of these sprockets 37 is effective for advancing the chains 50 with the conveyor pegs 54 on their shafts 53.

The conveyor pegs 54 at the table top 10 are supported on the trackways 31 by their rollers 58. The chains 50, to the extent necessary, are supported by their rollers 52 on the rail flanges 33, the primary support of the pegs 54, however, being effected by the rollers 58.

As the conveyor chains 50 are actuated, the conveyor pegs 54 are successively brought to locations at which the rollers 58 engage the peg control cams 60 and the rail sections 63. The rail sections 63 yield on the pivotal mountings provided by the links 66 as required, and against the force of the springs 68, to retain the pegs 54 upright during their downward movement as shown at the right of FIG. 1.

As the pegs 54 reach the bottom of their travel, they are supported by the engagement of the rollers 58 with the upper face of the base plate 24.

Upon further advancing movement of the pegs 24, they come into engagement with the rail sections 63 at the left of FIG. 1, move the same against the force of the springs 68 and hold the rail sections 63 to the left during upward movement of the pegs 54. As the pegs then reach upper positions they engage and are guided by the peg control cams 60 to positions for horizontal travel.

The spacing of the lower brackets 40, 41 and 42 permits the passage of the pegs 54 while the interconnection by the shafts 45 of the lower sprockets 47 aids in synchronizing the movement of the pairs of chains 50.

It will be noted that the pegs 54 are guided and accommodated so as to provide an accurately controlled advance along the table top 10 while during the inactive part of their cycle they occupy a minimum of space.

The application of driving force through the chains 50 is utilized in a manner which does not interfere with the guiding of the pegs 54, these multiple functions being accomplished in a simple but effective manner.

I claim:

1. A conveyor comprising a frame, said frame including end frame members, a member on said frame having a work surface extending horizontally between said end frame members and providing a work table with a longitudinal conveyor peg opening therealong, and a lower frame plate extending between said end frame members, longitudinally spaced pairs of upper shafts supported by said frame below said work surface, the ends of the shafts of each pair being in separated relation, aligned pairs of sprockets on said shafts, additional longitudinally spaced lower shafts parallel to said first pair of shafts and disposed therebelow in spaced relation thereto, sprockets on said additional shafts in alignment with the sprockets on said first pair of shafts, a pair of transversely spaced endless chains carried by said sprockets, a conveyor peg having a base with spaced pairs of rollers at each end thereof, said base between said pairs of rollers having a shaft connected to said chains for pivotally mounting said peg between said chains, said peg having an impelling arm extending through said opening for longitudinal movement with respect to said work surface, said additional shafts being in pairs and spaced for the passage of the arm of the peg therebetween, upper horizontal guide members engaging said rollers and said chains and retaining said peg with said arm disposed upwardly through said peg opening and having cams at the ends engaged by said rollers for retaining said peg with said arm disposed upwardly, fixed vertical guide members extending downwardly from said cams engaged by one pair of said rollers, and resiliently urged endwise movable guide members engaged by an opposite pair of said rollers for retaining said peg with said arm disposed upwardly, said lower plate providing a support for said peg and said chains.

2. A conveyor as defined in claim 1 in which additional pairs of sprockets are provided secured to each of said first mentioned shafts, other additional shafts are provided aligned with said first mentioned additional shafts and in longitudinally axially spaced relation thereto, said additional shafts and said other additional shafts have sprockets thereon, and additional pairs of chains are provided on said additional sprockets, said pair of chains having a conveyor peg pivotally mounted therebetween.

3. A conveyor as defined in claim 1 in which additional pairs of sprockets are provided secured to each of said first mentioned shafts, other additional shafts are provided aligned with said first mentioned additional shafts and in longitudinally axially spaced relation thereto, said additional shafts and said other additional shafts have sprockets thereon, and additional pairs of chains are provided on said additional sprockets, said pair of chains has a conveyor peg pivotally mounted therebetween, and one of said first mentioned pair of shafts has a driving member thereon for simultaneously driving both pairs of chains.

References Cited in the file of this patent

UNITED STATES PATENTS

| 1,971,875 | Pert | Aug. 28, 1934 |
| 2,248,004 | Lipton | July 1, 1941 |
| 2,623,746 | Gegenheimer et al. | Dec. 30, 1952 |
| 2,658,605 | DeWitt | Nov. 10, 1953 |
| 2,822,914 | Barnett | Feb. 11, 1958 |

FOREIGN PATENTS

| 572,008 | Germany | Mar. 9, 1933 |